Oct. 31, 1972          A. F. EMMERSON          3,701,560
AUTOMOTIVE VEHICLE BODY ACCESS AND DRAIN PLUG
Filed Dec. 30, 1970
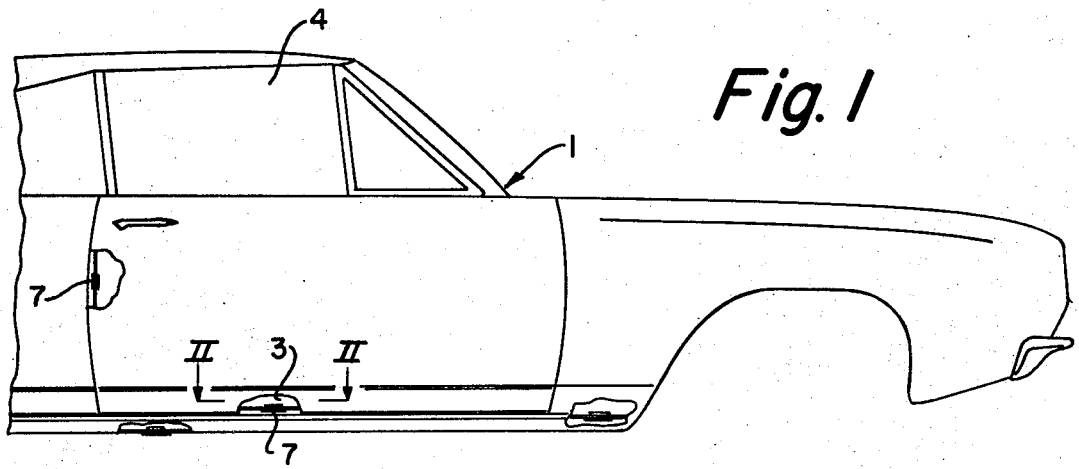
Fig. 1
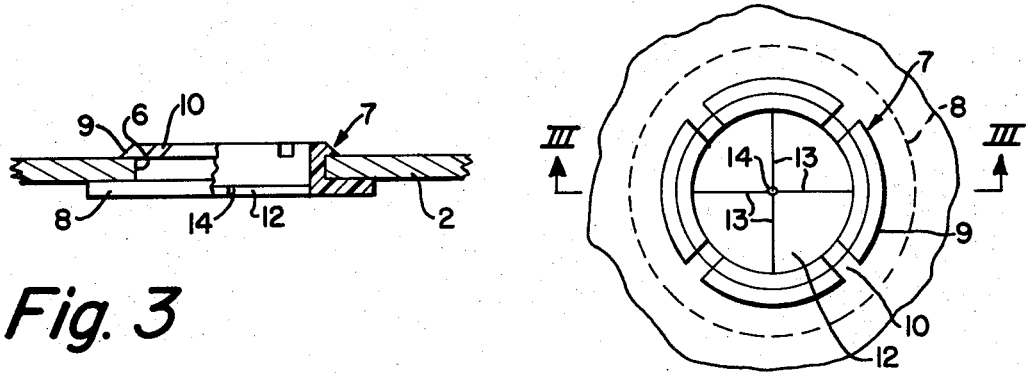
Fig. 3
Fig. 2
INVENTOR
ARTHUR F. EMMERSON
BY Brown, Murray,
Flick & Peckham
ATTORNEYS United States Patent Office 3,701,560
Patented Oct. 31, 1972

3,701,560
AUTOMOTIVE VEHICLE BODY ACCESS AND DRAIN PLUG
Arthur F. Emmerson, 539 Walnut Drive,
Euclid, Ohio 44132
Filed Dec. 30, 1970, Ser. No. 102,861
Int. Cl. F16k 15/14
U.S. Cl. 296—1 R     3 Claims

ABSTRACT OF THE DISCLOSURE

An automotive vehicle body has walls that form a chamber between them, such as a hollow door. At least one of the walls has an opening through it. In the case of a door there would be such an opening in the bottom. This opening is filled by a resilient closure plug that has a central passage through it, which normally is substantially closed by a transverse flexible wall. This wall is provided with at least three uniformly spaced radial slots intersecting at its center to form flaps that can move back and forth to open and close the wall.

---

Automotive vehicles, such as autos and trucks, have sheet metal bodies that are provided with a number of chambers. These chambers are found in the hollow doors and sometimes beneath the front fenders and behind the rocker panels. Water often accumulates in these chambers and causes corrosion. If drain openings are provided, road dust and dirt can accumulate in the chambers where it holds moisture and hastens corrosion. Furthermore, the vehicles often leave the factory with no rust proofing coating on the inner surfaces of the chambers just referred to. If the owner of the vehicle wishes to have rust proofing applied, it generally requires drilling into the closed chambers so that the nozzle of the apparatus for applying rust proofing can be inserted. Afterwards, these openings need to be plugged.

It is among the objects of this invention to provide an automotive vehicle body, in which the chambers therein are provided with openings for access to their interiors and for draining of water therefrom, the openings being provided with plugs that seal the chambers from outside dust and dirt but that allow drainage, drying out of the interior of the chambers and access for rust proofing apparatus.

The preferred embodiment of the invention is illustrated in the accompanying drawings, in which FIG. 1 is a fragmentary side view of an automobile body with parts broken away in section;

FIG. 2 is an enlarged fragmentary plan view taken on the line II—II of FIG. 1; and FIG. 3 is a vertical section taken on the line III—III of FIG. 2.

Referring to the drawings, a sheet metal automobile body 1 is provided with the usual doors 2 that have double walls, between which there is a chamber 3 in which the door latch and window raising and lowering mechanism is located. Although there is a seal between the door glass 4 and the surrounding metal, water always leaks past it and runs down into the hollow interior of the door. This water will in time corrode the inside of the door if it is not rust proofed, and the corrosion will be hastened if the inside of the door cannot be dried out.

According to this invention the bottom of the door is provided with at least one drain opening 6, but to prevent road dust and dirt from entering the hollow door through this opening it is normally closed by a plug 7. The opening may be round, oval, rectangular or polygonal, and the plug is the same shape so that it will fit snugly in it. The plug may be made of synthetic rubber or a suitable plastic. It is tubular and has a flange 8 at its lower or outer end that overlaps and engages the bottom of the door. The plug projects up into the door and its upper end is surrounded by an integral shoulder 9 that overlaps and engages the inner or upper surface of the lower wall of the door to hold the plug securely in place. This shoulder is tapered upwardly to facilitate insertion of the plug in the opening, and the plug is resilient enough to permit the shoulder to be pushed up through the opening. The inner or upper end portion of the plug is provided with three or four uniformly spaced radial slots 10 that extend entirely through the shoulder. These slots serve two purposes. They separate the portion of the plug that projects into the door chamber into several circumferentially spaced segments that can be flexed radially inward so that the shoulder can contract enough to pass through the door opening 6. Also, they allow water around the shoulder to drain into the vertical passage through the plug.

The passage through the plug normally is substantially closed by a thin transverse partition wall 12 that is integral with the rest of the plug. Preferably, this wall is at or near the lower end of the plug. It is divided into at least three triangular segments by radial slits 13 (FIG. 2) that intersect at the center of the wall. The segments can bend or flex up and down to open the wall, but normally they remain horizontal. Preferably, there are four slits, with the opposed sides of the slits engaging each other so that the wall normally substantially seals the passage through the plug. However, the wall slits can be enlarged where they intersect in order to form a small permanent central drain opening 14 through the wall flaps are flexed inwardly and when he removes the late in the door, due to a heavy rain or to the car passing through an automatic car wash, the weight of the water will bend the flexible flaps downward so that the water can quickly run out of the door.

The flexible flaps also facilitate drying out of the interior of the door. When the car is in the sun the air in the door will become heated and expand. The humid expanding air will escape through the plug until the pressure inside and outside the door is equal. When the door cools off, the air inside will contract and outside air will be drawn in through the plug. This breathing of the door, which is permitted by the flexible partition wall in the plug, aids the drying out of the inside of the door.

It is also a feature of this invention that a plug such as the one just described can be mounted in an opening in the side edge of a door to form a normally closed access opening for the nozzle of apparatus with which the inside of the door can be rust proofed. The plug therefore makes it unnecessary for the rust proofer to drill a hole in the door and to later plug it. When he inserts the nozzle the wall flaps are flexed upwardly and when he removes the nozzle they return to their original position and seal the opening.

Other plugs of the same construction can be inserted for the same purposes in the bottom walls of double walled fenders and in the bottom of the chambers formed behind rocker panels. By the use of these plugs, rusting out of automobile bodies is delayed or avoided.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. An automotive vehicle body having walls provided with a chamber therein that collects rain water, said chamber having a bottom wall provided with an opening therethrough, and a resilient drain plug filling said opening, the plug having a central vertical passage therethrough normally substantially closed by a transverse flexible wall at its lower end provided with at least three spaced radial slots intersecting at the center of the wall to form flaps that can flex downwardly to permit water to escape from said chamber, said plug projecting up into said chamber and being surrounded by an integral shoulder overlapping the upper surface of said bottom wall, said shoulder and upper end of the plug being provided with transverse slots therethrough to allow water around the shoulder to drain into said vertical passage.

2. An automotive vehicle body according to claim 1, in which said chambers is in a door formed by said walls.

3. An automotive vehicle body according to claim 1, in which said plug wall slits are enlarged where they intersect, whereby to form a permanent central drain opening in said transverse wall.

References Cited
UNITED STATES PATENTS

| | | | |
|---|---|---|---|
| 3,382,889 | 5/1968 | Heinz et al. | 137—525.3 |
| 2,937,658 | 5/1960 | Stewart | 137—525 |
| 3,158,176 | 11/1964 | Toland | 137—525 |
| 3,200,571 | 8/1965 | Shufflebotham | 137—525 |

LEO FRIAGLIA, Primary Examiner

J. A. PEKAR, Assistant Examiner

U.S. Cl. X.R.
49—476; 137—525; 296—476